United States Patent
Proefke et al.

(10) Patent No.: US 9,403,417 B2
(45) Date of Patent: Aug. 2, 2016

(54) METHODS AND SYSTEMS FOR PRECONDITIONING VEHICLES

(75) Inventors: David T. Proefke, Madison Heights, MI (US); Clark E. McCall, Ann Arbor, MI (US); William A. Biondo, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1411 days.

(21) Appl. No.: 12/403,168

(22) Filed: Mar. 12, 2009

(65) Prior Publication Data

US 2010/0235046 A1    Sep. 16, 2010

(51) Int. Cl.
*B60H 1/00* (2006.01)
*G05D 23/00* (2006.01)
*F02N 11/08* (2006.01)

(52) U.S. Cl.
CPC ........ *B60H 1/00642* (2013.01); *B60H 1/00657* (2013.01); *B60H 1/00735* (2013.01); *B60H 1/00814* (2013.01); *F02N 11/0807* (2013.01); *F02N 2200/0804* (2013.01)

(58) Field of Classification Search
CPC ........... B60H 1/00642; B60H 1/00657; B60H 1/00814; B60H 1/00735; F02N 11/0807; F02N 2200/0804
USPC ............... 701/10, 36, 112, 113, 2; 123/179.2, 123/179.3; 340/425.5, 5.61, 5.63; 307/10.6; 236/46 R, 91 D; 165/61
See application file for complete search history.

(56) References Cited

U.S. PATENT DOCUMENTS

| | | | |
|---|---|---|---|
| 5,000,139 A * | 3/1991 | Wong | 123/179.2 |
| 6,147,418 A * | 11/2000 | Wilson | 307/10.6 |
| 6,345,767 B1 * | 2/2002 | Burrus et al. | 236/1 R |
| 6,396,388 B1 * | 5/2002 | Dong | 340/5.62 |
| 6,778,065 B1 * | 8/2004 | Asakura et al. | 340/5.61 |
| 6,895,917 B2 * | 5/2005 | Itoh et al. | 123/179.4 |
| 7,280,908 B2 * | 10/2007 | Maehara et al. | 701/113 |
| 7,441,414 B2 * | 10/2008 | Ziehr et al. | 62/244 |
| 7,542,827 B2 * | 6/2009 | Gerard et al. | 701/2 |
| 7,650,864 B2 * | 1/2010 | Hassan et al. | 123/179.2 |
| 7,823,399 B2 * | 11/2010 | Egawa | 62/178 |
| 2006/0171246 A1 * | 8/2006 | Iwanari et al. | 365/233 |
| 2007/0102930 A1 * | 5/2007 | Koike et al. | 290/18 |
| 2007/0128899 A1 * | 6/2007 | Mayer | 439/152 |
| 2008/0117079 A1 * | 5/2008 | Hassan | 340/901 |
| 2008/0147270 A1 * | 6/2008 | Sakane et al. | 701/36 |
| 2008/0264087 A1 * | 10/2008 | Harumoto et al. | 62/190 |
| 2010/0106363 A1 * | 4/2010 | Mandujano | 701/36 |
| 2010/0206957 A1 * | 8/2010 | Vyas et al. | 236/46 R |
| 2011/0205017 A1 * | 8/2011 | Lazzara | 340/5.64 |

FOREIGN PATENT DOCUMENTS

DE    10243562 A1    4/2004
JP    2006298326    * 11/2006

* cited by examiner

*Primary Examiner* — Marthe Marc-Coleman
(74) *Attorney, Agent, or Firm* — Ingrassia Fisher & Lorenz, P.C.

(57) ABSTRACT

A method for preconditioning a vehicle includes the steps of obtaining a temperature inside the vehicle and remotely starting an engine of the vehicle, an environmental control system of the vehicle, or both, if the temperature inside the vehicle is within a predetermined range of temperatures.

10 Claims, 2 Drawing Sheets

METHODS AND SYSTEMS FOR PRECONDITIONING VEHICLES

TECHNICAL FIELD

The present invention generally relates to the field of vehicles and, more specifically, to methods and systems for preconditioning vehicles.

BACKGROUND OF THE INVENTION

Certain vehicles today include remote start systems and algorithms that enable a user of the vehicle to remotely start an engine of the vehicle, to thereby remotely start an environmental control system to precondition the vehicle. Such a remote start of the engine may be desired, for example, if the user wishes to have the vehicle's interior heated or cooled before the user enters the vehicle. However, if the engine is remotely started for an extended period of time, this can result in a use of fuel, energy, and/or other resources that may be greater than is optimal or desired.

Accordingly, it is desirable to provide an improved method for preconditioning a vehicle, such as through remotely starting an engine and/or an environmental control system of the vehicle, for example that leaves the engine remotely started for an appropriate period of time. It is also desirable to provide an improved program product for such preconditioning of a vehicle. It is further desirable to provide an improved system for such preconditioning of a vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for preconditioning a vehicle is provided. The method comprises the steps of obtaining a temperature inside the vehicle, and remotely starting an engine of the vehicle, an environmental control system of the vehicle, or both, if the temperature inside the vehicle is within a predetermined range of temperatures.

In accordance with another exemplary embodiment of the present invention, a program product for preconditioning a vehicle is provided. The program product comprises a program and a computer-readable signal bearing media. The program is configured to at least facilitate obtaining a temperature inside the vehicle, and remotely starting an engine of the vehicle, an environmental control system of the vehicle, or both, if the temperature inside the vehicle is within a predetermined range of temperatures. The computer-readable signal bearing media bears the program.

In accordance with a further exemplary embodiment of the present invention, a system for preconditioning a vehicle is provided. The system comprises a remote control and a processor. The remote control provides a remote start request to the vehicle. The processor is coupled to the remote control. The processor is configured to receive the remote start request and to at least facilitate starting an engine of the vehicle, an environmental control system of the vehicle, or both, upon receiving the remote start request, provided that the temperature inside the vehicle is within a predetermined range of temperatures.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
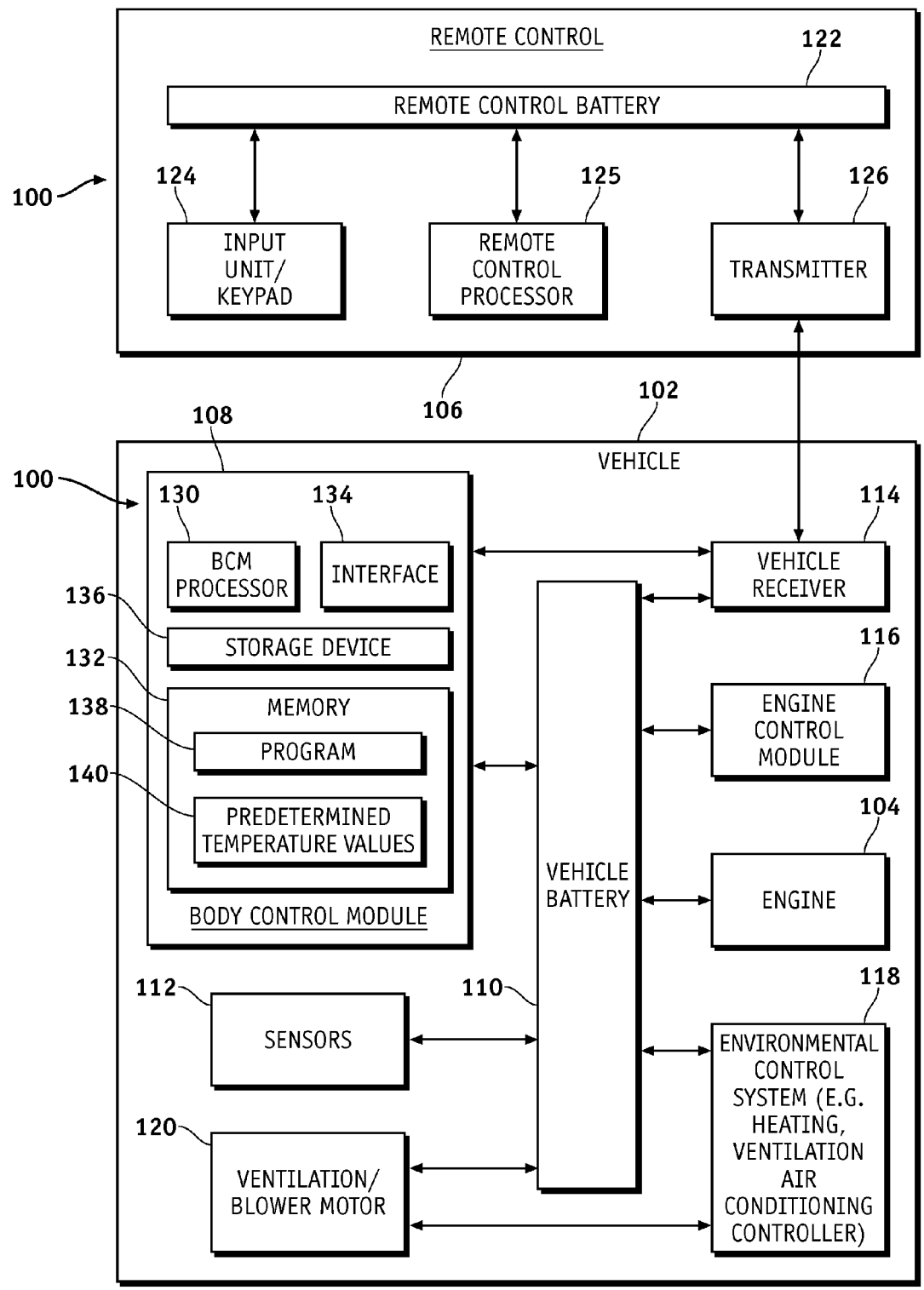
FIG. 1 is a functional block diagram of a control system for preconditioning a vehicle, depicted along with representations of selected portions of an exemplary vehicle, in accordance with an exemplary embodiment of the present invention.

FIG. 1 is a functional block diagram of a control system 100 for preconditioning a vehicle 102, for example by adaptively remotely starting an engine 104 of a vehicle 102 and/or an environmental control system 118 of the vehicle 102, in accordance with an exemplary embodiment of the present invention. As shown in FIG. 1, the vehicle 102 preferably also includes a vehicle battery 110, a plurality of sensors 112, a vehicle receiver 114, an engine control module 116, an environmental control system 118, and a ventilation fan 120. The sensors are preferably used to determine one or more of the following: a temperature inside the vehicle 102, a temperature outside the vehicle, and/or a visibility through a windshield of the vehicle 102.

In certain preferred embodiments, the vehicle 102 comprises an automobile such as a sedan, a truck, a van, a sport utility vehicle, or another type of automobile. However, in various embodiments, the control system 100 can be used in connection with any number of types of vehicles and/or systems thereof.

As depicted in FIG. 1, the control system 100 comprises a remote control 106 and a body control module 108. The remote control 106 comprises a remote control battery 122, an input unit 124, a remote control processor 125, and a transmitter 126. The input unit 124 receives inputs from a user of the vehicle when the user desires the engine 104 and/or the environmental control system 118 of the vehicle 102 to be started, for example to precondition the interior of the vehicle. Specifically, in one preferred embodiment, the remote control 106 comprises a key fob unit or similar device, and the input unit 124 comprises a keypad. The remote control processor 125 processes the inputs received from the user via the input unit 124, and provides instructions to the transmitter 126 to provide appropriate remote start requests to the vehicle in accordance with the inputs provided by the user. The transmitter 126 transmits the remote start requests to the vehicle 102, where the remote start requests are received by the vehicle receiver 114, and the remote start requests are ultimately implemented by the body control module 108.

The body control module 108 is configured, along with the remote control 106, to precondition the vehicle 102. Specifically, in accordance with an exemplary embodiment, the body control module 108 is configured to at least facilitate receiving information regarding the remote start requests as well as temperature-related information. The temperature-related information preferably comprises values of a temperature inside the vehicle 102, a temperature outside the vehicle 102, and a visibility through a windshield of the vehicle 102, and is preferably obtained from the above-referenced sensors 112 of the vehicle 102. The body control module 108 is further configured to determine a target temperature for the vehicle 102 using the temperature-related information, and to control and manage a remote start of the engine 104 and/or the environmental control system 118 of the vehicle 102 to achieve the target temperature using the temperature-related temperature after the remote start requests are received.

In the depicted embodiment, the body control module 108 includes a body control module (BCM) processor 130, a memory 132, a non-depicted bus, an interface 134, and a storage device 136. The BCM processor 130 performs the computation and control functions of the body control module 108 or portions thereof, preferably in performing the steps of the process 200 depicted in FIG. 2 and described further below in connection therewith. Specifically, in a preferred embodiment, the BCM processor 130 is configured to at least facilitate receiving the information regarding the remote start requests and the temperature-related information, determining a target temperature for the vehicle 102 using this information, and controlling a remote start of the engine 104 and/or the environmental control system 118 of the vehicle 102 using this information in order to achieve the target temperature.

The BCM processor 130 may comprise any type of processor or multiple processors, single integrated circuits such as a microprocessor, or any suitable number of integrated circuit devices and/or circuit boards working in cooperation to accomplish the functions of a processing unit. During operation, the BCM processor 130 executes one or more programs 138 preferably stored within the memory 132 and, as such, controls the general operation of the body control module 108.

As referenced above, the memory 132 stores a program or programs 138 that execute one or more embodiments of processes such as the process 200 described below in connection with FIG. 2 and/or various steps thereof and/or other processes, such as those described elsewhere herein. In addition, in one preferred embodiment, the memory 132 stores various predetermined temperature values 140 that are retrieved from the memory 132 by the BCM processor 130 and utilized in determining the target temperature, for example as set forth in the process 200 depicted in FIG. 2 and described further below in connection therewith.

The memory 132 can be any type of suitable memory. This would include various types of dynamic random access memory (DRAM) such as SDRAM, various types of static RAM (SRAM), and various types of non-volatile memory (PROM, EPROM, and flash). It should be understood that the memory 132 may be a single type of memory component, or it may be composed of many different types of memory components. In addition, the memory 132 and the BCM processor 130 may be distributed across several different computers. For example, a portion of the memory 132 may reside on a computer within a particular apparatus or process, and another portion may reside on a remote computer.

The bus serves to transmit programs, data, status, and other information or signals between the various components of the body control module 108. The bus can be any suitable physical or logical means of connecting computer systems and components. This includes, but is not limited to, direct hardwired connections, fiber optics, and infrared and wireless bus technologies.

The interface 134 allows communication to the body control module 108, for example from a vehicle user, a system operator, and/or another computer system, and can be implemented using any suitable method and apparatus. In a preferred embodiment, the interface 134 provides information to the BCM processor 130 for use in controlling a remote start of the vehicle 102. In a preferred embodiment, the information includes the above-referenced information as to the remote start requests as well as the above-referenced temperature-related information to the BCM processor 130.

The storage device 136 can be any suitable type of storage apparatus, including direct access storage devices such as hard disk drives, flash systems, floppy disk drives and optical disk drives. In one exemplary embodiment, the storage device 136 is a program product from which memory 132 can receive a program 138 that executes one or more embodiments of the process 200 of FIG. 2 and/or steps thereof as described in greater detail further below. In one preferred embodiment, such a program product can be implemented as part of, inserted into, or otherwise coupled to the control system 100. As one exemplary implementation, the body control module 108 may also utilize an Internet website, for example for providing or maintaining data or performing operations thereon.

It will be appreciated that while this exemplary embodiment is described in the context of a fully functioning computer system for the body control module 108, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the body control module 108 depicted in FIG. 1 may comprise any one or more of a number of other types of control modules and/or computer systems in various other embodiments of the present invention.

Figure 2:
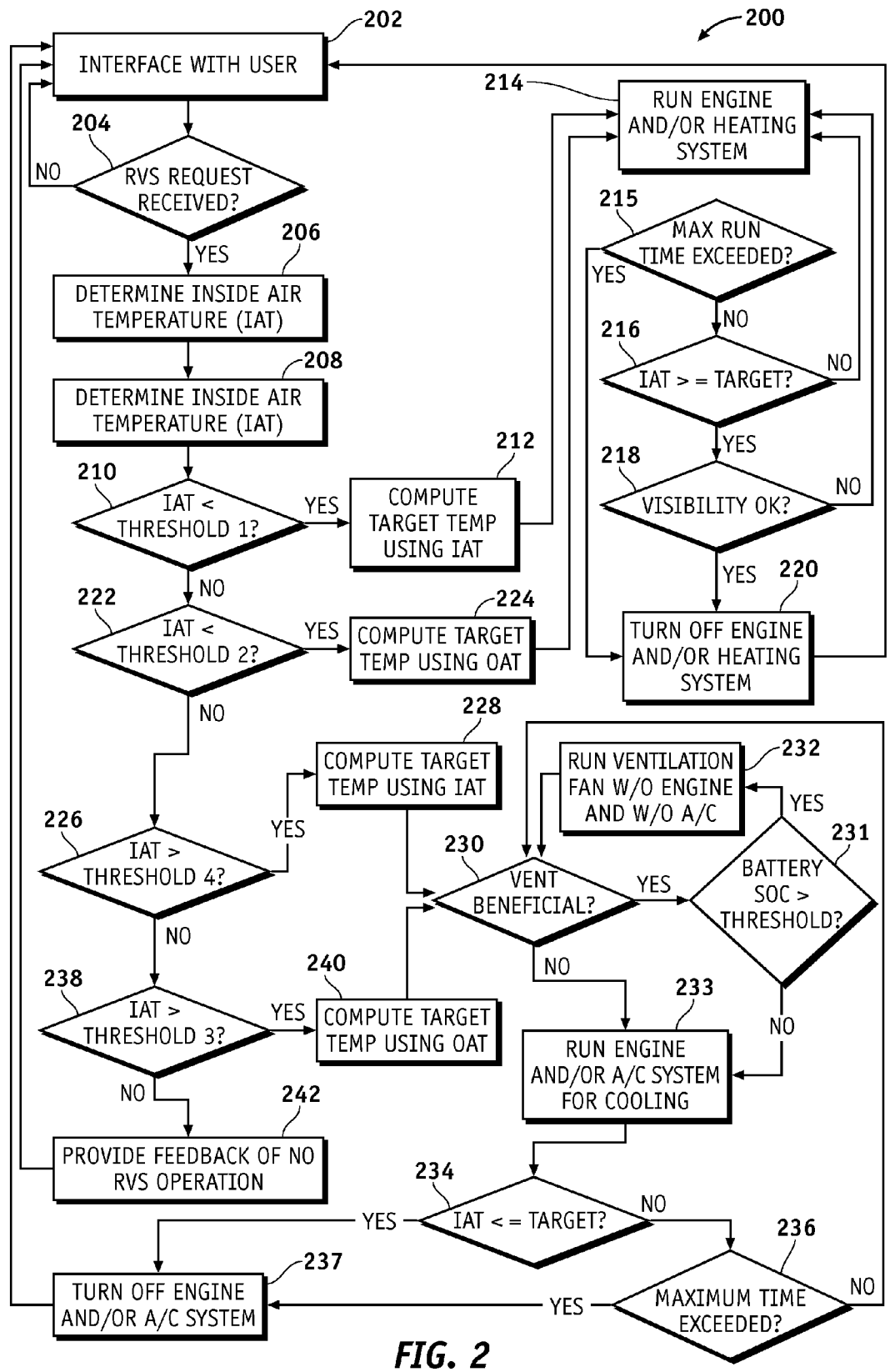
FIG. 2 is a flowchart of a process for preconditioning a vehicle that can be implemented in connection with the control system and the vehicle of FIG. 1, in accordance with an exemplary embodiment of the present invention.

FIG. 2 is a flowchart of a process 200 for preconditioning a vehicle, in accordance with an exemplary embodiment of the present invention. In a preferred embodiment, the process 200 can be implemented in connection with the control system 100 of FIG. 1 and/or through program products that can be utilized in connection therewith in remotely starting an engine of a vehicle, such as the engine 104 of the vehicle 102 of FIG. 1, and/or an environmental control system, such as the environmental control system 118 of FIG. 1. However, it will be appreciated that in various embodiments the process 200 may also be utilized in connection with any number of different types of systems and/or other devices.

As depicted in FIG. 2, the process 200 includes the step of receiving a remote start request from a user (step 202). In a preferred embodiment, the body control module 108 interfaces with the remote control 106 of FIG. 1 via the vehicle receiver 114 of FIG. 1 to receive the remote start request and/or information pertaining thereto. In one exemplary embodiment, the body control module 108 receives remote start requests from the user to start the engine 104 and/or the environmental control system 118 of the vehicle 102 of FIG. 1 before the user enters the vehicle. In a preferred embodiment, the user initiates the remote start request by pressing a button on a key fob of or otherwise manipulating the control system 100 of FIG. 1.

A determination is then made as to whether a remote start request has been received (step 204). In a preferred embodiment, this determination is made by the BCM processor 130 of FIG. 1 as to whether the interface 134 of FIG. 1 has received a request from the user to remotely start the engine 104 and/or the environmental control system 118 of the vehicle 102.

If it is determined in step 204 that no remote start request has been received, then the process returns to step 202. Steps 202 and 204 then repeat until a determination is made in a subsequent iteration of step 204 that a remote start request has been received.

Once a determination is made in any iteration of step 204 that a remote start request has been received, then an inside air temperature (IAT) is determined (step 206). In one preferred embodiment, the inside air temperature is determined by one or more sensors inside the vehicle, such as one or more sensors 112 of FIG. 1. Also in a preferred embodiment, the inside air temperature is determined by the BCM processor 130 of FIG. 1 using information provided by one or more of the sensors 112 of FIG. 1.

In addition, an outside air temperature (OAT) is determined (step 208). In one preferred embodiment, the outside air temperature is determined by one or more sensors inside the vehicle, such as one or more sensors 112 of FIG. 1. Also in a preferred embodiment, the outside air temperature is determined by the BCM processor 130 of FIG. 1 using information from one or more of the sensors 112 of FIG. 1.

A determination is then made as to whether the inside air temperature is less than a first predetermined threshold value (step 210). In a preferred embodiment, this determination is made by the BCM processor 130 of FIG. 1 by comparing the inside air temperature to a first predetermined threshold value of the predetermined temperature values 140 stored in the memory 132 of FIG. 1. Also in a preferred embodiment, the first predetermined threshold value represents a value below which a certain amount of heating is desired, regardless of the outside air temperature. In addition, in one exemplary embodiment, the first predetermined threshold value is equal to forty-five degrees Fahrenheit. However, this may vary in other embodiments.

If it is determined in step 210 that the inside air temperature is less than the first predetermined threshold value, then a target temperature is computed (step 212). In a preferred embodiment, the target temperature is computed by the BCM processor 130 of FIG. 1 using the inside air temperature. In one exemplary embodiment, the target temperature in step 212 is equal to a constant, such as sixty degrees Fahrenheit when the inside air temperature is less than the first predetermined threshold value (e.g., forty-five degrees Fahrenheit).

The vehicle engine and/or the environmental control system (preferably, an air conditioning system of the vehicle) are remotely started and begin running (step 214). In one preferred embodiment, the engine 104 of the vehicle 102 of FIG. 1 is remotely started by the body control module 108 of FIG. 1 using energy or power from the vehicle battery 110 of FIG. 1.

A determination is then made as to whether a maximum run time has been exceeded (step 215). In a preferred embodiment, the maximum run time is a predetermined maximum amount of time that the engine 104 and/or the environmental control system 118 of FIG. 1 should be allowed to run under during preconditioning of the interior of the vehicle under any conditions. Also in a preferred embodiment, this determination is made by the BCM processor 130 of FIG. 1.

If it is determined in step 215 that the maximum run time has not been exceeded, then a further determination is made as to whether the inside air temperature is greater than or equal to the target temperature (step 216). In a preferred embodiment, this determination is also made by the BCM processor 130 of FIG. 1. Conversely, if it is determined in step 215 that the maximum run time has been exceeded, then the processor instead proceeds to step 220, and the engine 104 and/or the environmental control system 118 of FIG. 1 are turned off, preferably via instructions provided by the BCM processor 130 of FIG. 1.

Returning now to step 216, if a determination is made in step 216 that the inside air temperature is less than the target temperature, then the process returns to step 214, and steps 214-216 repeat until there is a determination in an iteration in step 216 that the inside air temperature is greater than or equal to the target temperature. Once there is a determination in any iteration of step 216 that the inside air temperature is greater than or equal to the target temperature, a determination is then made as to whether visibility through a windshield (preferably a front windshield) of the vehicle is acceptable (step 218). Preferably this determination is made by the BCM processor 130 of FIG. 1 utilizing information provided by one or more of the sensors 112 of FIG. 1 and/or cameras of the vehicle 102 (preferably one or more such sensors 112 and/or cameras proximate a front windshield of the vehicle).

If a determination is made in step 218 that the visibility is not acceptable, then the process returns to step 214, and steps 214-218 repeat until there is a determination in a subsequent iteration of step 218 that the visibility is acceptable. Once there is a determination in any iteration of step 218 that the visibility is acceptable, then the process proceeds to the above-referenced step 220, and the engine 104 and/or the environmental control system 118 of FIG. 1 are turned off, preferably via instructions provided by the BCM processor 130 of FIG. 1.

The engine and/or environmental control system is then turned off (step 220) once the temperature inside the vehicle is reached and the visibility is verified. In certain other embodiments, the engine and/or environmental control system may be turned off once the target temperature is verified without verifying visibility, or vice versa, among other possible variations. In one preferred embodiment, the engine 104 of FIG. 1 is turned off by the body control module 108 of FIG. 1 via instructions provided by the BCM processor 130 of FIG. 1.

Returning now to step 210, if it is determined in step 210 that the inside air temperature is greater than or equal to the first predetermined threshold value, then a determination is made as to whether the inside air temperature is less than a second predetermined threshold value (step 222). In a preferred embodiment, this determination is made by the BCM processor 130 of FIG. 1 by comparing the inside air temperature to a second predetermined threshold value of the predetermined temperature values 140 stored in the memory 132 of FIG. 1. Also in a preferred embodiment, the second predetermined threshold value represents a value that is greater than the first predetermined threshold value, but for which a lesser amount of heating is still desired. In addition, in one exemplary embodiment, the second predetermined threshold value is equal to sixty degrees Fahrenheit. However, this may vary in other embodiments.

If it is determined in step 222 that the inside air temperature is less than the second predetermined threshold value, then a different target temperature is computed (step 224). In a preferred embodiment, the target temperature is computed by the BCM processor 130 of FIG. 1 using the inside air temperature and the outside air temperature. In one exemplary embodiment in which the first predetermined threshold value is equal to forty-five degrees Fahrenheit and the second predetermined threshold value is equal to sixty degrees Fahrenheit, the target temperature in step 224 is equal to the following: (i) sixty degrees Fahrenheit, if the outside air temperature is equal to forty-five degrees Fahrenheit, (ii) sixty-one degrees Fahrenheit, if the outside air temperature is equal to forty-six degrees Fahrenheit, (iii) sixty-two degrees Fahrenheit, if the outside air temperature is equal to forty-seven degrees Fahrenheit, (iv) sixty-three degrees Fahrenheit, if the outside air temperature is equal to forty-eight degrees Fahrenheit, (v) sixty-four degrees Fahrenheit, if the outside air temperature is equal to forty-nine degrees Fahrenheit, (vi) sixty-five degrees Fahrenheit, if the outside air temperature is equal to fifty degrees Fahrenheit, (vii) sixty-six degrees Fahrenheit, if the outside air temperature is equal to fifty-one degrees Fahrenheit, and (viii) sixty-six degrees Fahrenheit, if the outside air temperature is between fifty-one and sixty-one degrees Fahrenheit. However, this may vary in other embodiments.

The process then proceeds to the above-referenced steps 214-220 using the target temperature determined in step 224. Specifically, a determination is made as to whether the maximum run time has been exceeded (step 215), a determination is made as to whether the inside air temperature is greater than or equal to the target temperature determined in step 224 (step 216), and the engine and/or environmental control system are turned off once it is determined that the visibility is acceptable and the inside air temperature is greater than or equal to the target temperature determined in step 224 (step 220).

Conversely, if it is determined in step 222 that the inside air temperature is greater than or equal to the second predetermined threshold value, then a determination is made as to whether the inside air temperature is less than a fourth predetermined threshold value (step 226). In a preferred embodiment, this determination is made by the BCM processor 130 of FIG. 1 by comparing the inside air temperature to a fourth predetermined threshold value of the predetermined temperature values 140 stored in the memory 132 of FIG. 1. Also in a preferred embodiment, the fourth predetermined threshold value represents a value that is greater than the first and second predetermined threshold values, and represents a value above which a certain amount of cooling is desired regardless of the outside air temperature. In addition, in one exemplary embodiment, the fourth predetermined threshold value is equal to one hundred degrees Fahrenheit. However, this may vary in other embodiments.

If a determination is made in step 226 that the inside air temperature is greater than the fourth predetermined threshold value, then a different target temperature is computed following step 226 (step 228). In a preferred embodiment, the target temperature is computed by the BCM processor 130 of FIG. 1 using the inside air temperature. In one exemplary embodiment in which the fourth predetermined threshold value is equal to one hundred degrees Fahrenheit, the target temperature in step 228 is equal to eighty degrees Fahrenheit. However, this may vary in other embodiments.

A determination is made as to whether use of a ventilation fan of the vehicle would be beneficial in cooling the vehicle (step 230). In a preferred embodiment, this determination is made by the BCM processor 130 of FIG. 1. Also in a preferred embodiment, the ventilation fan is deemed to be beneficial in cooling the vehicle if the inside air temperature is more than twenty degrees Fahrenheit greater than the outside air temperature. However, this may vary in other embodiments.

If a determination is made in step 230 that use of the ventilation fan is beneficial in cooling the vehicle (for example, if the inside air temperature is more than twenty degrees Fahrenheit greater than the outside air temperature, in a preferred embodiment), then a determination is made as to whether a state of charge of the vehicle battery is greater than a predetermined battery charge threshold (step 231). In a preferred embodiment, this determination is made by the BCM processor 130 of FIG. 1. Also in a preferred embodiment, the predetermined battery charge threshold represents a minimum amount of state of charge of the battery necessary to run the ventilation fan 120 of FIG. 1 while still maintaining enough state of charge to subsequently start the engine 104 and/or the environmental control system 118 of FIG. 1.

If it is determined in step 231 that the state of charge of the battery is greater than the predetermined battery charge threshold, then the ventilation fan is used for a preliminary cooling of the vehicle without the engine and without the environmental control system (e.g., without an air conditioning unit of the vehicle, for example, to preserve energy and/or other resources), (step 232), after which the process returns again to step 230. In one preferred embodiment, such preliminary cooling by the ventilation fan in step 232 is utilized until a rate of changes of temperature over time reaches a predetermined threshold. However, this may vary in other embodiments. In one such preferred embodiment, this predetermined threshold is between two degrees Fahrenheit per minute and five degrees Fahrenheit per minute. However, this may also vary in other embodiments.

Conversely, if it is determined in step 231 that the state charge of the battery is less than or equal to the predetermined battery charge threshold, then the process proceeds instead to step 233. Also, once a determination is made in any iteration of step 230 that the ventilation fan is no longer beneficial, then the process also proceeds directly to step 233. In step 233, the engine and/or environmental control system (i.e., an air conditioning system) of the vehicle are started, preferably based on instructions provided by the BCM processor 130 of FIG. 1.

A determination is then made as to whether the inside air temperature is less than or equal to the target temperature determined in step 228 (step 234). In a preferred embodiment, this determination is made by the BCM processor 130 of FIG. 1. If it is determined in step 234 that the inside air temperature is less than or equal to the target temperature determined in step 228, then the engine and/or the environmental control system are turned off (step 237) (preferably via instructions provided by the BCM processor 130 of FIG. 1), and the process then begins again in step 202 with further interface with the user.

Conversely, if it is determined in step 234 that the inside air temperature is greater than the target temperature determined in step 228, then a determination is made as to whether the maximum time has been exceeded (step 236). In a preferred embodiment, this determination is made by the BCM processor 130 of FIG. 1. If a determination is made in step 236 that the maximum time has been exceeded, then the process proceeds to the above-referenced step 237, and the engine and/or environmental control system are turned off, after which the process returns to the above-referenced step 202 for further interface with the user. Conversely, if a determination is made in step 236 that the maximum time has not been exceeded, then the process returns to step 230, and steps 230-236 then repeat until there is a determination in a subsequent iteration of step 236 that the maximum time has been exceeded.

Returning now to step 226, if it is determined in step 226 that the inside air temperature is less than or equal to the fourth predetermined threshold value, then a determination is made as to whether the inside air temperature is greater than a third predetermined threshold value (step 238).

In a preferred embodiment, this determination is made by the BCM processor 130 of FIG. 1 by comparing the inside air temperature to a third predetermined threshold value of the predetermined temperature values 140 stored in the memory 132 of FIG. 1. Also in a preferred embodiment, the third predetermined threshold value represents a value that is greater than the first and second predetermined threshold values but less than the fourth predetermined threshold value, and represents a value above which a certain amount of cooling is still desired. In addition, in one exemplary embodiment, the third predetermined threshold value is equal to eighty degrees Fahrenheit. However, this may vary in other embodiments.

If it is determined in step 238 that the inside air temperature is greater than the third predetermined value, then a different target temperature is computed following step 238 (step 240). In a preferred embodiment, the target temperature is computed by the BCM processor 130 of FIG. 1 using the inside air temperature. In one exemplary embodiment in which the third predetermined threshold value is equal to eighty degrees Fahrenheit, the target temperature in step 240 is equal to seventy-two degrees Fahrenheit. However, this may vary in other embodiments. The process then proceeds to the above-referenced steps 230-237 using the new target temperature determined in step 240 as the target temperature. Conversely, if it is determined in step 238 that the inside air temperature is less than or equal to the third predetermined threshold value, then the process proceeds instead to step 242. In step 242, feedback is provided that no remote starts of the engine or environmental control system are in effect, and the process then begins anew with new interfacing with the user in a subsequent iteration of step 202.

It will be appreciated that certain steps of the process 200 may differ from and/or may be performed simultaneously or in a different order than those depicted in FIG. 1 and described herein. For example, in certain embodiments, the target temperatures and/or the computation thereof may vary. In addition, in certain embodiments, the target temperature may be determined in part using preferences of the user of the vehicle. In various other embodiments, fluid of a heating and/or air conditioning unit of the vehicle may be heated or cooled to a target temperature rather than the inside air temperature, so that the heating and/or air conditioning unit is ready to operate at peak effectiveness when the user enters the vehicle while still conserving energy and/or other resources. Various other additions, deletions, and/or other modifications to the process 200 of FIG. 2, the steps thereof and/or the order thereof, and/or the control system 100 of FIG. 1 and/or the components thereof, may also be implemented in various embodiments of the present invention.

Accordingly, improved methods, program products, and systems are provided for preconditioning a vehicle. The improved methods, program products, and systems allow for improved and controlled remote starting of an engine and/or an environmental control system (e.g., an air conditioning and/or heating unit) of a vehicle. For example, the improved methods, program products, and systems allow for the user of the vehicle to experience a comfortable temperature when entering the vehicle without having the engine and/or environmental control system operating for a longer time than is necessary to attain a desired temperature for the vehicle. Accordingly, the improved methods, program products, and systems allow for the user of the vehicle to experience a comfortable temperature when entering the vehicle while otherwise minimizing the use of energy and/or other resources.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for preconditioning a vehicle, the method comprising the steps of:
    obtaining a temperature inside the vehicle;
    obtaining a temperature outside the vehicle;
    calculating a target temperature:
        using the temperature inside the vehicle and not the temperature outside the vehicle if the temperature inside the vehicle is within a first range of values; and
        using both the temperature inside the vehicle and the temperature outside the vehicle if the temperature inside the vehicle is within a second range of values, wherein the second range of values is different from the first range of values;
    remotely starting an engine of the vehicle, an environmental control system of the vehicle, or both, if the temperature inside the vehicle is within a predetermined range of temperatures; and
    turning off the engine, the environmental control system, or both, if the temperature inside the vehicle reaches the target temperature.

2. The method of claim 1, wherein the step of calculating the target temperature comprises the steps of:
    calculating the target temperature using the temperature inside the vehicle and not the temperature outside the vehicle if the temperature inside the vehicle is less than a predetermined threshold; and
    calculating the target temperature using both the temperature inside the vehicle and the temperature outside the vehicle if the temperature inside the vehicle is greater than the predetermined threshold.

3. The method of claim 1, wherein the step of calculating the target temperature comprises the steps of:
    calculating the target temperature using the temperature inside the vehicle and not the temperature outside the vehicle if the temperature inside the vehicle is greater than a predetermined threshold; and
    calculating the target temperature using both the temperature inside the vehicle and the temperature outside the vehicle if the temperature inside the vehicle is less than the predetermined threshold.

4. The method of claim 1, wherein the step of calculating the target temperature comprises the steps of:
    calculating the target temperature using the temperature inside the vehicle and not the temperature outside the vehicle if the temperature inside the vehicle is less than a first predetermined threshold or greater than a second predetermined threshold, wherein the second predetermined threshold is greater than the first predetermined threshold; and calculating the target temperature using both the temperature inside the vehicle and the temperature outside the vehicle if the temperature inside the vehicle is greater than the first predetermined threshold and less than the second predetermined threshold.

5. The method of claim 1, further comprising the step of:

ascertaining visibility through a windshield of the vehicle;

wherein the step of turning off the engine, the environmental control system, or both, comprises the step of turning off the engine, the environmental control system, or both if the temperature inside the vehicle reaches the target temperature, provided further that the visibility through the windshield is verified as being an acceptable level of visibility.

6. A system for preconditioning a vehicle, the system comprising:

a remote control configured to provide a remote start request to the vehicle; and a processor coupled to the remote control, the processor configured to at least facilitate:
   obtaining a temperature inside the vehicle;
   obtaining a temperature outside the vehicle;
   calculating a target temperature:
      using the temperature inside the vehicle and not the temperature outside the vehicle if the temperature inside the vehicle is within a first range of values; and
      using both the temperature inside the vehicle and the temperature outside the vehicle if the temperature inside the vehicle is within a second range of values, wherein the second range of values is different from the first range of values;
   remotely starting an engine of the vehicle, an environmental control system of the vehicle, or both, if the temperature inside the vehicle is within a predetermined range of temperatures; and
   turning off the engine, the environmental control system, or both, if the temperature inside the vehicle reaches the target temperature.

7. The system of claim 6, wherein the processor is configured to at least facilitate:

calculating the target temperature using the temperature inside the vehicle and not the temperature outside the vehicle if the temperature inside the vehicle is less than a predetermined threshold; and calculating the target temperature using both the temperature inside the vehicle and the temperature outside the vehicle if the temperature inside the vehicle is greater than the predetermined threshold.

8. The system of claim 6, wherein the processor is configured to at least facilitate:

calculating the target temperature using the temperature inside the vehicle and not the temperature outside the vehicle if the temperature inside the vehicle is greater than a predetermined threshold; and calculating the target temperature using both the temperature inside the vehicle and the temperature outside the vehicle if the temperature inside the vehicle is less than the predetermined threshold.

9. The system of claim 6, wherein the processor is configured to at least facilitate:

calculating the target temperature using the temperature inside the vehicle and not the temperature outside the vehicle if the temperature inside the vehicle is less than a first predetermined threshold or greater than a second predetermined threshold, wherein the second predetermined threshold is greater than the first predetermined threshold; and calculating the target temperature using both the temperature inside the vehicle and the temperature outside the vehicle if the temperature inside the vehicle is greater than the first predetermined threshold and less than the second predetermined threshold.

10. The system of claim 6, wherein the processor is further configured to at least facilitate:

ascertaining visibility through a windshield of the vehicle; and turning off the engine, the environmental control system, or both if the temperature inside the vehicle reaches the target temperature, provided further that the visibility through the windshield is verified as being an acceptable level of visibility.

* * * * *